Figure 1:
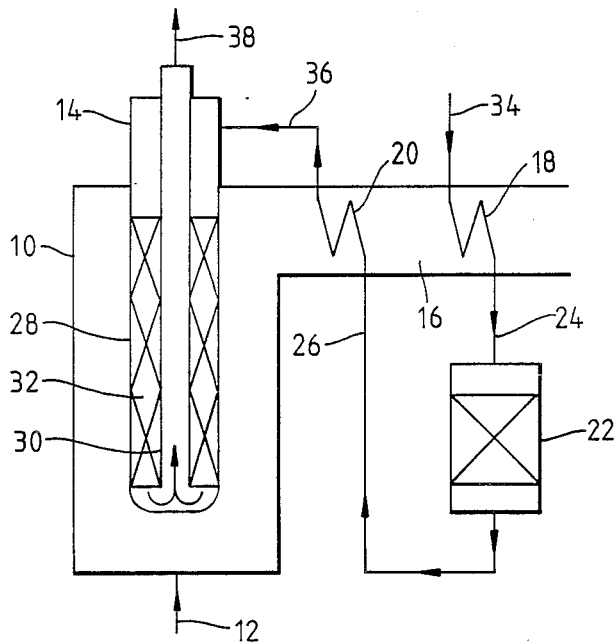

United States Patent [19]

Lywood

[11] Patent Number: 4,985,231
[45] Date of Patent: Jan. 15, 1991

[54] PRODUCTION OF HYDROGEN-CONTAINING GAS STREAMS

[75] Inventor: Warwick J. Lywood, Hutton Rudby, England

[73] Assignee: Imperial Chemical Industries PLC, London, England

[21] Appl. No.: 280,964

[22] Filed: Dec. 7, 1988

[30] Foreign Application Priority Data

Dec. 10, 1987 [GB] United Kingdom ............... 8728882

[51] Int. Cl.$^5$ .................................... C01B 3/26
[52] U.S. Cl. .................................... 423/652; 423/653; 423/654
[58] Field of Search ............... 423/652, 653, 654

[56] References Cited

U.S. PATENT DOCUMENTS

| 3,743,488 | 7/1973 | Bogart | 48/214 A |
| 4,271,086 | 6/1981 | Supp et al. | 518/704 |
| 4,383,982 | 5/1983 | Pinto | 423/359 |
| 4,690,690 | 9/1987 | Andrew et al. | 252/373 |
| 4,822,521 | 4/1989 | Fuderer | 423/359 |

FOREIGN PATENT DOCUMENTS 1296193 11/1972 Fed. Rep. of Germany .
820257 9/1959 United Kingdom .
1020014 2/1966 United Kingdom .
1043377 9/1966 United Kingdom .

OTHER PUBLICATIONS

Martyn V. Twigg, Catalyst Handbook, 1989, pp. 263, 368–372.

Primary Examiner—Wayne A. Langel
Attorney, Agent, or Firm—Cushman, Darby & Cushman

[57] ABSTRACT

A mixture (34) of a hydrocarbon feedstock with steam and/or carbon dioxide is preheated and adiabatically steam reformed giving a partially reformed gas (26) which is then, optionally after reheating, further steam reformed in annular catalyst regions (32) of a double tube reformer (14). The outer tubes (28) of the double tube reformer are heated by a hot gas stream (12), e.g. in a fired furnace or by the hot gas stream produced by subjecting the reformed gas withdrawn from the inner tubes (30) of the double tube reformer to secondary reforming. The preheating (18), and the reheating (20), if any, is effected by indirect heat exchange with a hot gas after the latter has heated the outer tubes of the double tube reformer and/or with the reformed gas.

5 Claims, 1 Drawing Sheet

PRODUCTION OF HYDROGEN-CONTAINING GAS STREAMS

This invention relates to the production of hydrogen-containing gas streams by catalytic steam reforming a hydrocarbon feedstock, such as natural gas or naphtha, or a hydrocarbon derivative feedstock such as methanol.

In the steam reforming reaction a reforming gas, ie steam, and/or carbon dioxide, reacts with the feedstock, in the presence of a suitable catalyst, typically nickel and/or cobalt supported on a refractory oxidic material such as alumina, zirconia, or calcium aluminate cement, to form hydrogen and carbon monoxide. Typically, where the feedstock is methane, the reactions are:

$$CH_4 + H_2O \rightarrow CO + 3H_2$$

$$CH_4 + 2H_2O \rightarrow CO_2 + 4H_2$$

$$CH_4 + CO_2 \rightarrow 2CO + 2H_2$$

The steam reforming reaction is endothermic and is operated at high temperatures; in order that the equilibrium lies in favour of the production of hydrogen, the reaction is effected using an excess of the reforming gas and under conditions such that the temperature of the gas leaving the catalyst is typically in an excess of 650° C. The heat required for the endothermic steam reforming reaction is supplied from the sensible heat of the reformer feed mixture, ie the feedstock/reforming gas mixture, and/or from an external source, eg by disposing the reforming catalyst in tubes, the exteriors of which are heated by passing a hot gas stream, eg from burners, past the tubes.

In most applications of the steam reforming process it is necessary to cool the reformed gas, possibly after further processing steps such as secondary reforming as is practised for ammonia synthesis gas production: in order to provide an efficient process, heat is usually recovered from the hot reformed gas. Where heat for the endothermic steam reforming reaction is supplied directly or indirectly by combusting a fuel in a furnace, in the interests of thermal efficiency, heat is likewise normally recovered from the furnace flue gases. Normally this heat is recovered by a steam power system wherein boiler feed water is heated, high pressure steam is raised and usually superheated, and then the high pressure steam is expanded in a turbine with the recovery of power, eg for export as electricity or for compression of the reformed gas, possibly after further processing steps such as the shift reaction, carbon oxides removal, water removal etc., for example where the reforming stage is part of an overall process producing ammonia and/or methanol. Often it can be arranged that the exhaust from the turbine is at a suitable pressure for use as process steam, ie for use as the reforming gas.

However, especially where the reforming step is part of an integrated process involving a subsequent exothermic stage such as methanol or ammonia synthesis, or compression of the reformed gas is not required, such a power steam system recovering heat from the reformed gas and/or from the furnace flue gas produces more steam than is required, resulting in a considerable steam and/or power export. This is not always advantageous and it would be desirable to devise a reforming process wherein the amount of heat that has to be recovered to give an economic process is reduced. In some cases it would be desirable to eliminate the steam power system, at least in so far as it is recovering heat from the furnace flue gas and the reformed gas.

In one form of steam reformer design, the reforming tubes are each double tubes comprising an outer tube, closed at one end, disposed round an inner tube and the catalyst is disposed in the annular space between the inner and outer tubes. Heat is supplied by passing a hot gas stream past the exterior surfaces of the outer tubes. The feed mixture is fed to the open end of the outer tube, passes through the annular space, therein contacting the catalyst, and then is withdrawn through the inner tube. Heat exchange takes place between the reformed gas passing through the inner tube and the feed mixture undergoing the steam reforming reaction in the catalyst-containing region. This heat exchange has the effect of supplying some of the required heat for the endothermic steam reforming reaction, thus giving a saving in the amount of heat that has to be supplied to the exterior surfaces of the outer tubes, and also cooling the reacted gas. In some cases, where the reformed gas is subjected to a further processing step such as secondary reforming and is then passed over the exterior surfaces of the outer tubes to heat them, it may be desirable to limit this heat exchange by providing insulation between the inner tube and the catalyst as described in U.S. Pat. No. 4,690,690.

In another form of reformer design the catalyst is disposed in one or more adiabatic beds so that the heat required for reforming is supplied by the sensible heat of the feed mixture fed to the reformer. In this type of reformer the feed mixture is preheated to a sufficiently high temperature by means of a fired furnace, and, where there are a plurality of beds in series, the gas leaving one bed is preferably reheated before entering the next bed. An example of this type of reformer is described in U.S. Pat. No. 3,743,488.

We have now realised that, by the use of an adiabatic reformer in series with a double tube reformer, significant advantages may be achieved. In preferred forms of the invention, no steam power system recovering heat from the reformed gas and/or furnace flue gas is necessary in order to provide an efficient process.

Accordingly we provide a process for the production of a hydrogen-containing gas stream comprising:
(a) forming a gaseous feed mixture of a hydrocarbon, and/or hydrocarbon derivative, feedstock, and steam and/or carbon dioxide as a reforming gas;
(b) preheating said feed mixture;
(c) partially reforming the preheated feed mixture in at least one adiabatic bed of steam reforming catalyst, thereby forming a partially reformed gas;
(d) feeding said partially reformed gas to the outer tubes of a double tube reformer and passing the partially reformed gas over a steam reforming catalyst in the annular catalyst regions of said double tube reformer, while supplying heat to the exterior of said outer tubes by passing a hot gas stream past the tubes, thereby forming a reformed gas;
(e) withdrawing the reformed gas from the region adjacent the closed end of each of the outer tubes through the inner tube associated with that outer tube; and
(f) supplying the heat:
  (i) for the preheating step b); and also
  (ii) for any reheating of partially reformed gas after it has passed through an adiabatic bed before it is passed through another adiabatic bed (if any) and/or before it is fed to said outer tubes;
by heat exchange with:
(I) the reformed gas after passage of the latter through said inner tubes; and/or
(II) the hot gas stream after it has been used to heat said tubes in step (d).

The gaseous feed mixture preferably contains steam as the reforming gas: the amount of steam in the gaseous feed mixture is generally such that the "steam ratio", i.e. the ratio of the number of moles of steam to the number of gram atoms of carbon in the hydrocarbon feedstock, is in the range 1 to 6, preferably 1.5 to 4.

The adiabatic, and double-tube, reforming stages are preferably carried out at substantially the same pressure, the pressure difference between the steps being essentially the result of the pressure drop encountered as the gas stream passes through the stages. Preferably both stages are effected at a pressure in the range 10 to 100, particularly 20 to 60, bar abs.

The adiabatic reforming stage is preferably effected at an inlet temperature in the range 400° to 650° C. and the double tube reforming stage effected such that the reformed gas leaving the annular catalyst region of the double tube reformer has a temperature in the range 650° to 950° C., particularly 750° to 900° C.

In one form of the invention the exterior surfaces of the double tube reformer are heated in a fire furnace, i.e. a furnace fired by combustion of a fuel stream giving a hot gas stream that does not subsequently form part of the process gas stream. It is preferred in this case that the flue gas from the furnace is used for some or all of the preheating, and/or for reheating (if any). Where the partially reformed gas is reheated before being fed to the outer tubes of the double tube reformer, and this reheating is effected by heat exchange with the furnace flue gas, it is preferred that the furnace flue gas is used for that reheating before being used for the aforesaid preheating. The reformed gas leaving the inner tubes of the double tube reformer may also be used to supply heat for preheating (and/or reheating) prior to any further processing after leaving the inner tubes. Where the reformed gas is used for such preheating (and/or reheating) before being subjected to a further process step, it is preferred that there is no insulation between the inner tubes and the steam reforming catalyst in the annular region between the outer tube and its associated inner tube so that significant heat exchange takes place between the reformed gas passing through the inner tube and the partially reformed gas passing over the catalyst in the annular region. In this way some of the heat required for the reforming in the annular region is supplied by the sensible heat of the reformed gas passing through the inner tube, resulting in cooling of the reformed gas passing through the inner tube and a reduction in the amount of heat that has to be supplied to the external surfaces of the outer tubes. This results in a reduction in the furnace fuel requirement.

Thus after passage through the inner tubes, the reformed gas may be used to supply heat required for the adiabatic reforming step by preheating the feed mixture. This has the effect of cooling the reformed gas to a temperature somewhat above the temperature of the feed mixture.

Alternatively, or additionally, the reformed gas is used to reheat the partially reformed gas prior to passage of the latter through another adiabatic bed and/or prior to passage of the partially reformed gas to the double tube reformer.

Where multiple adiabatic beds are employed, the partially reformed gas leaving one bed is preferably reheated before feeding it to the next bed, by heat exchange with the reformed gas or with furnace flue gas. Also after leaving the adiabatic reforming section and prior to feeding to the double tube reformer, the partially reformed gas is preferably reheated by heat exchange as aforesaid.

In another embodiment of the invention, the reformed gas leaving the inner tubes is fed to a secondary reformer wherein it is partially combusted with an oxygen-containing gas, e.g. oxygen, air, or oxygen-enriched air, and then passed over a secondary reforming catalyst. The secondary reformed gas, which will often have a temperature in an excess of 850° C., may then be cooled by using it as the source of heat for heating the exterior of the outer tubes in the double tube reformer, thereby obviating the need for a fired furnace to heat the reformer tubes. Such an arrangement is described in U.S. Pat. Nos. 4,750,986 and in 4,690,690. As explained in U.S. Pat. No. 4,690,690, in this case it may be desirable to insulate the walls of the inner tubes of the double tube reformer to minimise the decrease in temperature of the reformed gas occurring as the reformed gas passes through the inner tubes. After use for heating the outer tubes, the secondary reformed gas is then cooled by using it for the preheating of the feed mixture, and for any reheating. In some cases it may be desirable to provide for indirect heat exchange between:
(a) the secondary reformed gas, after it has been used to heat the exterior of the outer tubes in the double tube reformer and before it is used for the preheating and/or any inter-adiabatic reforming bed reheating as aforesaid, and
(b) the reformed gas leaving the inner tubes and before the latter is fed to the secondary reformer;
the oxygen-containing gas fed to the secondary reformer in order to preheat the latter; and/or
the partially reformed gas leaving the adiabatic catalyst bed prior to the feeding thereof to the outer tubes of the double tube reformer.

In some cases it is desired to subject the reformed gas, by which term we include gas that has been subjected to a secondary reforming process after leaving the double tube reformer, to the shift reaction:

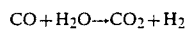

$$CO + H_2O \rightarrow CO_2 + H_2$$

to increase its hydrogen content and to reduce its carbon monoxide content. In many cases it will be found that the reformed gas, where it has been used for the aforesaid preheating, and/or reheating, may be at a temperature suitable for feeding to the shift reaction. The latter reaction is exothermic and so, after the shift reaction, the shifted gas will have a somewhat higher temperature.

The reformed gas may be cooled, before or after shift, by heat exchange in a steam system. Where the reformer tubes are heated in a fired furnace, the use of some of the heat in the furnace flue gas to effect the preheating (and/or reheating) reduces the amount of heat that has to be recovered from the furnace flue gas and reformed gas as steam to provide an efficient process. This means that a simplified steam system can be employed, simply to raise the process steam and steam superheating can be eliminated.

Where it is desired to minimise, or eliminate a steam system, the reformed gas, and/or furnace flue gas, may be cooled by indirect heat exchange with a stream of water in order to produce a stream of hot water which may then be contacted with the feedstock to saturate the latter to form a feedstock/steam mixture suitable for use as the gaseous feed mixture fed to the preheater.

Often, after cooling the reformed gas, water is removed from the reformed gas, or from the shifted gas where there is a shift stage, by further cooling, if necessary, to below the dewpoint of the steam in the gas stream. The condensed water is then separated and may be used as part of the water stream that is heated by the aforesaid heat exchange. In some cases it is possible to effect the cooling of the reformed or shifted gas to below the dew point, and the separation of condensed water, in a single stage by direct contact of the reformed gas, after use for the aforesaid feed preheating and/or reheating, or the shifted gas produced by subjecting the reformed gas to the shift reaction, with a stream of water, giving a stream of hot water which is then used, after further heating by indirect heat exchange with the reformed gas and/or furnace flue gas. for saturation of the feedstock. Prior to saturation the feedstock is preferably preheated by heat exchange with the reformed or shifted gas and/or with the furnace flue gas if a fired furnace is employed to heat the reformer tubes. The shift reaction may be carried out in a reactor provided with heat exchange surfaces whereby the exothermic heat of reaction is transferred to a coolant fluid, particularly water under pressure which may provide the stream of hot water employed for saturating the feedstock.

A flowsheet showing a reformed gas heat recovery system not employing a power steam system is shown in FIG. 4 of U.S. Pat. No. 4,695,442. That flowsheet discloses cooling shifted gas by direct contact with water and using the resultant water stream, after heating by heat exchange with shifted gas and with reformed gas, for the saturation of the feedstock. That flowsheet also shows the use of a shift process operated in heat exchange with water giving a hot water stream used to supply heat to the water stream used for saturation. Also in that flowsheet, a double tube reformer having the outer tubes heated by secondary reformed gas is employed, but there is no preliminary adiabatic reforming stage. Application of the present invention in such an arrangement, ie so that the secondary reformed gas, after heating the tubes of the double tube reformer, is used to preheat the feed to an adiabatic steam reforming stage to which the feed is supplied before passing to the outer tubes of the double tube reformer, and possibly also to reheat the partially reformed gas from that adiabatic reforming stage, would result in a reduction in the size, and hence cost, of the double tube reformer required to give a desired throughput of reformed gas.

In some cases, particularly where the tubes of the double tube reformer are heated in a fired furnace and the reformed gas leaving the inner tubes is not subjected to a subsequent secondary reforming process, a high temperature shift catalyst may be provided in the inner tubes of the double tube reformer so that the gas leaving the tubes is shifted: this has the advantage that, since the shift reaction is exothermic, the heat evolved can be transferred through the wall of the inner tube and hence supplement that part of the heat required for the endothermic reforming in the annular catalyst-containing region provided from the hot gas passing through the inner tube.

The reformed, or shifted gas, where a shift stage is employed, is often treated to remove carbon dioxide. This may be effected by a conventional "wet" process wherein the carbon dioxide is absorbed by a regenerable absorbent liquid. Alternatively carbon dioxide may be removed by subjecting the reformed or shifted gas stream to a pressure swing adsorption process. Where necessary, other components of the reformed or shifted gas may be removed by known methods, e.g. cryogenic separation, membrane separation, or pressure swing adsorption. For example where there is a secondary reforming step using air as the oxygen-containing gas and the amount of air employed is such that the reformed, or shifted gas contains more nitrogen than is desired in the product, then the excess of nitrogen may be removed by a pressure swing adsorption process as described in U.S. Pat. Nos. 4,695,442 or 4,778,670 along with the carbon dioxide. Such a process will also remove some or all of the residual methane and some of the residual carbon monoxide. The waste gas from such a pressure swing adsorption process will normally contain some combustibles and so may be employed as part, or all, of the fuel required to heat the outer tubes of the double tube reformer where this heating is effected in a fired furnace. Where there is no such fired furnace, the waste gas may be combusted, e.g. catalytically, and the heat recovered, for example by heat exchange with oxygen-containing gas employed in any secondary reforming step or by heat exchange with water in order to provide, or preheat, a water stream used for boiler feed water or for saturation of the feedstock. In some cases it may be desirable to recycle some of the carbon dioxide separated in such a pressure swing adsorption process to the feed mixture as some or all of the reforming gas.

Figure 2:
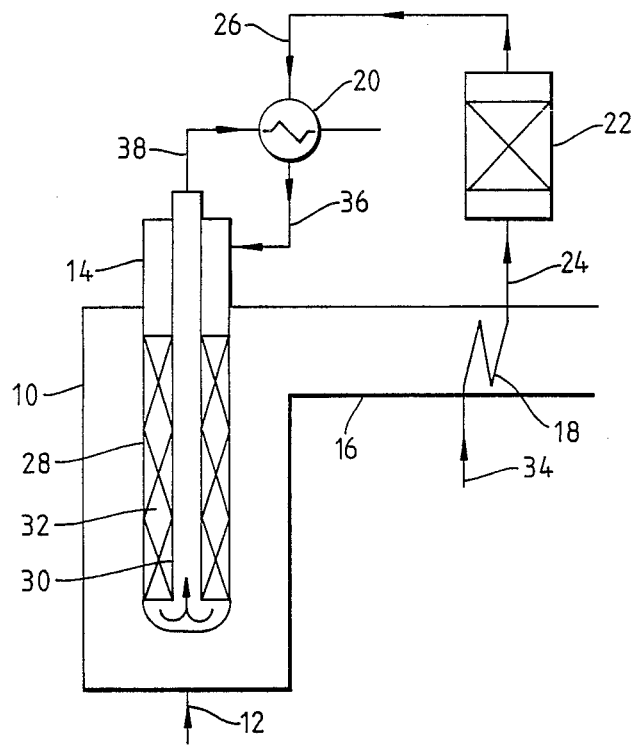

Two embodiments of the invention are illustrated with reference to the accompanying drawings wherein FIG. 1 is a diagrammatic representation of a flowsheet wherein partially reformed gas is reheated in the furnace flue duct; and FIG. 2 is a diagrammatic representation of a flowsheet wherein partially reformed gas is reheated by the reformed gas.

In FIG. 1 a furnace 10 is shown fired with fuel gas fed via line 12. The furnace has a double tube reformer 14 disposed therein and has a flue duct 16 in which are disposed heat exchangers 18 and 20. An adiabatic reformer 22 containing a bed of a primary steam reforming catalyst is disposed between the outlet 24 of heat exchanger 18 and the inlet 26 of heat exchanger 20. The double tube reformer 14 comprises a plurality of outer tubes 28, only one of which is shown, closed at the lower end. Disposed coaxially within each outer tube 28 is an inner tube 30, having an open lower end, extending to just above the lower end of tube 28. A primary steam reforming catalyst bed 32 is disposed in the annular space between each outer tube 28 and its associated inner tube 30.

A feed of a mixture of desulphurised natural gas and steam (added for example by saturation by contacting the desulphurised feedstock with a stream of heated water) is fed via line 34 to heat. exchanger 18 where it is preheated by the flue gas from the furnace. The preheated gas is then fed from the outlet 24 of heat exchanger 18 to the adiabatic reformer 22 wherein the preheated gas passes through the bed of steam reforming catalyst. As it passes through the bed, steam reforming of the natural gas takes place giving a partially reformed gas stream that is substantially cooler than the feed to the adiabatic reformer. The partially reformed gas is fed from the adiabatic reformer 22 to the inlet 26 of heat exchanger 20 wherein the partially reformed gas is reheated. The reheated gas is then fed, via line 36, to the upper end of tube 28 and passes down through the catalyst bed 32 disposed within the annulus between tubes 28 and 30. Heat is supplied to the outside surface of tube 28 by the stream of hot combustion gas in furnace 10. Further reforming of the gas stream takes place as the partially reformed gas passes down through the catalyst bed 32. The reformed gas then passes up through the inner tube 30, transferring heat through the wall of the tube 30 thereby supplying some of the heat required for the endothermic steam reforming reaction occurring in bed 32. The reformed gas then leaves tube 30 via line 38 at a temperature substantially below the temperature at which it left the reforming catalyst bed 32 at the lower end of tube 28.

In the embodiment of FIG. 2 the arrangement is similar except that heat exchanger 20 is heated by the reformed gas leaving the tube 30 instead of the gases in the flue duct 16.

Gas compositions and temperatures of a calculated example of the embodiment of FIG. 1 are shown in the Table 1.

The temperature of the reformed gas at the lower end of tube 30 is 865° C. The heat load required to effect the reforming in the double tube reformer is 5.02 MW and this requires a furnace firing of 8.5 MW.

In the embodiment of FIG. 2, with the same amount of feed and firing and preheating of the adiabatic reformer feed to 550° C., the temperature of the reformed gas, having the same composition as set out in the table, after heat exchange in heat exchanger 20, would be 592° C. with a corresponding increase in the amount of heat recoverable from the furnace flue gas.

By way of comparison, using a double tube reformer but omitting the adiabatic reformer 22 and heat exchanger 20 so that the temperature of the gas entering the tube 28 was at the preheat temperature of 550° C., in order to achieve the above reformed gas composition at an outlet temperature of 695° C., the reformer heat load would be 5.62 MW requiring firing of 9.5 MW.

Likewise if the double tube reformer were replaced with a conventional "straight through" reformer, and the adiabatic reformer and heat exchanger 20 omitted so that the temperature of the gas entering the reformer tubes was at the preheat temperature of 550° C. and the reformer outlet temperature was 865° C., the reformer heat load is 6.64 MW requiring firing of 11.2 MW.

TABLE 1

| | Stream | | | |
|---|---|---|---|---|
| | 24 | 26 | 36 | 38 |
| Temperature (°C.) | 550 | 466 | 580 | 695 |
| Pressure (bar abs.) | 28.5 | 28.0 | 28.0 | 25.1 |
| Flow rate (kg · mol · h$^{-1}$) | | | | |
| methane | 93.7 | 91.8 | 91.8 | 18.8 |
| ethane | 3.2 | 0 | 0 | 0 |
| propane | 0.4 | 0 | 0 | 0 |
| butane | 0.1 | 0 | 0 | 0 |
| carbon monoxide | 0 | 0.2 | 0.2 | 52.8 |
| carbon dioxide | 0.4 | 10.1 | 10.1 | 30.5 |
| steam | 305.2 | 285.6 | 285.6 | 192.2 |
| hydrogen | 2.5 | 35.1 | 35.1 | 274.5 |
| nitrogen | 2.2 | 2.2 | 2.2 | 2.2 |

In the above cases, to make an efficient process, heat will normally be recovered from the furnace flue gas and from the reformed gas. This heat can be recovered as steam, ie by boiler feed water heating, steam raising and, possibly, steam superheating, and the steam so produced can be used as the process steam. Any surplus steam can be exported as such or as power produced by a condensing steam turbine wherein the steam is let down to form a water stream.

If the amount of heat that need be recovered to produce an efficient process is such that the amount of steam produced is substantially equal to the amount of process steam employed, i.e. so that there is no surplus steam, there is no need to export steam. In some cases where the amount of steam is substantially equal to the amount of process steam required, the steam so raised may be at a pressure significantly above the process pressure: power can be recovered for export, or for use in a downstream operation, e.g. compression, from the steam by the use of a non-condensing turbine wherein the turbine exhaust pressure is at, or only slightly above, the process pressure so that the turbine exhaust steam is then used as the process steam. Non-condensing turbines are significantly cheaper than condensing turbines.

Alternatively, where the amount of heat that need be recovered to provide an efficient process is such that the amount of steam so produced is substantially equal to the process steam requirement, rather than raise steam directly, it may be preferably to recover the heat from the furnace flue gas and reformed gas by heating water to produce a hot water stream which is then used to saturate the feedstock.

Thus in a preferred process the gaseous feed mixture contains steam, heat is recovered from the flue gas (in processes employing a fired furnace to heat the tubes of the double tube reformer), and the reformed gas, after use thereof for the preheating and any reheating, and said recovered heat is employed to produce steam, the amount of steam so produced substantially equalling the amount of steam employed in the gaseous feed mixture, whereby there is no export of steam as such and/or production of power in a condensing-turbine.

To illustrate this, the amount of steam that is produced from the recovered heat to give an efficient process for the above example (Case A) and comparisons (Cases B and C) is shown in Table 2.

TABLE 2

| | Case A | Case B | Case C |
|---|---|---|---|
| Reformer heat load (MW) | 5.02 | 5.62 | 6.64 |
| Reformer firing required (MW) | 8.5 | 9.5 | 11.2 |
| Steam raised (te/hr) | 5.5 | 7.9 | 9.3 |
| Process steam required (te/hr) | 5.5 | 5.5 | 5.5 |
| Steam for export (te/hr) | 0 | 2.4 | 3.8 |

Case A—double tube reformer plus preliminary adiabatic bed. The embodiment of FIG. 2 gives the same results.

Case B—double tube reformer: no adiabatic bed.

Case C—conventional reformer: no adiabatic bed.

It is thus seen that the combination of a double tube reformer and an adiabatic reforming stage represents a considerable saving in the amount of firing required and thus a reduction in the amount of heat that has to be recovered e.g. as steam.

In the above example of the FIGS. 1 and 2 embodiments, i.e. Case A, the heat recoverable from the reformed gas and the flue gas is in balance with that required to produce the process steam, and so no steam export is necessary to give an efficient process. The heat can be recovered by heating water to provide hot water for saturation of the gas feed. In contrast, in the comparative cases B and C, to provide an efficient process, steam has to be exported as such or as power: since the amount of steam raised is in an excess of that required for the process steam, for an efficient process, if the export is to be as power, condensing turbines are required.

I claim:

1. A process for the production of a hydrogencontaining gas stream comprising:
   (a) forming a gaseous feed mixture of a desulphurised natural gas and a reforming gas selected from steam, carbon dioxide, and mixtures of steam and carbon dioxide;
   (b) preheating said feed mixture;
   (c) partially reforming the preheated feed mixture in at least one adiabatic bed of steam reforming catalyst, thereby forming a partially reformed gas;
   (d) reheating said partially reformed gas after passage through said at least one adiabatic bed;
   (e) feeding said re-heated partially reformed gas to a double tube reformer having outer tubes each of which has a closed end and an inner tube associated with each outer tube thereby defining an annular region containing a steam reforming catalyst between each outer tube and its associated inner tube, said reformer being free of insulation between said inner tubes and said steam reforming catalyst in said annular region, said re-heated partially reformed gas being fed to outer tubes at ends thereof remote from said closed ends;
   (f) passing said re-heated partially reformed gas over said catalyst in said annular regions, while heating the exterior of said outer tubes in a fired furnace, thereby forming a reformed gas;
   (g) withdrawing said reformed gas from a region adjacent the closed end of each of said outer tubes through said inner tube associated with that outer tube, whereby heat exchange takes place between said reformed gas passing through said inner tubes and said re-heated partially reformed gas undergoing the steam reforming reaction in said annular regions, thus supplying some of the heat required for the endothermic steam reforming reaction; and
   (h) supplying the heat:
      (i) for the preheating step (b) and for any reheating of partially reformed gas after said partially reformed gas has passed through a first adiabatic bed and before said partially reformed gas has passed through another adiabatic bed (if any), by heat exchange with a flue gas from said fired furnace; and
      (ii) for the reheating step (d), wherein said partially reformed gas is re-heated before said partially reformed gas is fed to said outer tubes, by heat exchange with said reformed gas after passage of said reformed gas through said inner tubes and before any further processing thereof, or with said flue gas from said fired furnace.

2. A process according to claim 1 wherein the partially reformed gas is reheated by heat exchange with the furnace flue gas before the latter is used to preheat the feed mixture fed to the at least one adiabatic bed.

3. A process according to claim 1 wherein the gaseous feed mixture contains steam, heat is recovered from the flue gas, and the reformed gas, after use thereof for the preheating and reheating, and said recovered heat is employed to produce steam, the amount of steam so produced substantially equalling the amount of steam in the gaseous feed mixture, whereby there is no export of steam as such and/or no production of power in a condensing-turbine.

4. A process according to claim 1 wherein the reformed gas is cooled, optionally after further processing, by direct heat exchange with water, giving a heated water stream which is further heated by indirect heat exchange with the reformed gas and/or furnace flue gas and then contacted with the feedstock to form the feed mixture.

5. A process according to claim 1 wherein a shift catalyst is disposed in the inner tubes of the double tube reformer.

* * * * *